(12) United States Patent
Soane et al.

(10) Patent No.: US 9,555,418 B2
(45) Date of Patent: Jan. 31, 2017

(54) RECOVERING VALUABLE MINED MATERIALS FROM AQUEOUS WASTES

(75) Inventors: David S. Soane, Chestnut Hill, MA (US); Nathan Ashcraft, Somerville, MA (US); Phyo Kyaw, Cambridge, MA (US); Audrey Heidt, legal representative, Waltham, MA (US)

(73) Assignee: Soane Mining, LLC, Cambridge, MA (US)

( * ) Notice: Subject to any disclaimer, the term of this patent is extended or adjusted under 35 U.S.C. 154(b) by 858 days.

(21) Appl. No.: 13/479,999

(22) Filed: May 24, 2012

(65) Prior Publication Data

US 2013/0134074 A1  May 30, 2013

Related U.S. Application Data

(60) Provisional application No. 61/489,568, filed on May 24, 2011, provisional application No. 61/619,846, filed on Apr. 3, 2012.

(51) Int. Cl.

| | |
|---|---|
| *B03B 1/06* | (2006.01) |
| *B03D 3/06* | (2006.01) |
| *C02F 1/26* | (2006.01) |
| *B03B 5/28* | (2006.01) |
| *B03D 1/02* | (2006.01) |
| *C22B 3/24* | (2006.01) |
| *B03B 1/00* | (2006.01) |
| *C02F 101/20* | (2006.01) |
| *C02F 103/10* | (2006.01) |

(52) U.S. Cl.
CPC ............ *B03B 5/28* (2013.01); *B03D 1/026* (2013.01); *B03D 3/06* (2013.01); *C02F 1/26* (2013.01); *C22B 3/24* (2013.01); *B03B 1/00* (2013.01); *B03B 1/06* (2013.01); *C02F 2101/20* (2013.01); *C02F 2103/10* (2013.01); *Y02P 10/234* (2015.11)

(58) Field of Classification Search
USPC .................................. 209/9, 49, 162, 171
See application file for complete search history.

(56) References Cited

U.S. PATENT DOCUMENTS 2,769,538 A * 11/1956 Notzold et al. ............. 209/49
3,432,030 A *  3/1969 Olivier ................... B03D 1/06
                                              209/171

(Continued)

*Primary Examiner* — Thomas M Lithgow
(74) *Attorney, Agent, or Firm* — Elmore Patent Law Group, P.C.; Mahreen Chaudhry Hoda; Carolyn S. Elmore, Esq.

(57) ABSTRACT

Disclosed herein are systems and methods for recovering a target material from an aqueous stream. The target material can be a natively hydrophobic target material, such as a hydrocarbon material, such as coal. The target material can also have a surface modification that renders it hydrophobic. Systems for recovering the target material can comprise an extractant formulation comprising a light hydrocarbon solvent and a high molecular weight hydrophobic polymer, wherein the extractant formulation is mixable with the aqueous stream in a mixer to form an admixed solution having a hydrophobic portion and an aqueous portion, with the target material partitioning to the hydrophobic portion; a separator for isolating the hydrophobic portion from the aqueous portion; and a collector to which the hydrophobic portion is directed, wherein the target material is recovered from the hydrophobic portion.

9 Claims, 5 Drawing Sheets

(56) References Cited

U.S. PATENT DOCUMENTS

| | | | | |
|---|---|---|---|---|
| 3,665,066 A | * | 5/1972 | Capes et al. | 264/117 |
| 4,033,852 A | * | 7/1977 | Horowitz | C10L 9/02 |
| | | | | 208/403 |
| 4,076,505 A | * | 2/1978 | Dessau | B03B 9/005 |
| | | | | 201/17 |
| 4,272,250 A | * | 6/1981 | Burk et al. | 44/574 |
| 4,306,883 A | * | 12/1981 | Eckman | C10L 1/322 |
| | | | | 44/281 |
| 4,415,337 A | * | 11/1983 | Kutta et al. | 44/553 |
| 4,456,528 A | * | 6/1984 | Akimoto et al. | 209/49 |
| 4,544,490 A | | 10/1985 | Erickson et al. | |
| 4,632,750 A | * | 12/1986 | McGarry | B03D 1/008 |
| | | | | 209/166 |
| 4,857,221 A | * | 8/1989 | Brookes et al. | 252/61 |
| 5,171,427 A | * | 12/1992 | Klimpel et al. | 209/166 |
| 5,236,596 A | | 8/1993 | Greenwald, Sr. | |
| 5,256,169 A | | 10/1993 | Roe | |
| 5,476,522 A | * | 12/1995 | Kerr | B01D 21/01 |
| | | | | 210/734 |
| 6,855,260 B1 | | 2/2005 | Yoon | |
| 2003/0146167 A1 | | 8/2003 | Miller | |
| 2011/0017676 A1 | | 1/2011 | Franks et al. | |

* cited by examiner

RECOVERING VALUABLE MINED MATERIALS FROM AQUEOUS WASTES

RELATED APPLICATIONS

This application claims the benefit of U.S. Provisional Application No. 61/489,568, filed May 24, 2011 and U.S. Provisional Application No. 61/619,846, filed Apr. 3, 2012. The entire contents of the above applications are incorporated by reference herein.

FIELD OF APPLICATION

This application relates generally to recovering valuable mined materials from aqueous wastes.

BACKGROUND

Mining technologies remove valuable geological materials from the earth. The materials of value removed from the earth by mining can include rocks, stones, minerals, mineraloids, and the like. The term "rock" or "stone" refers to a naturally occurring solid aggregate comprising minerals or mineraloids. A mineral is a naturally occurring solid chemical substance formed through biogeological processes and having a specific set of chemical and physical characteristics, including a particular chemical composition, a crystalline or highly ordered physical structure, and discernible properties derived therefrom. Mineraloids have more variability in their chemical compositions, and they do not demonstrate crystallinity. Minerals, mineraloids or rocks having economic value can be extracted from the earth using a variety of mining technologies. Target materials of value recovered by mining include minerals, mineraloids and rocks such as precious and base metals, iron, uranium, limestone, rock salt, potash, oil shale, oil sands, coal, diamonds, an the like.

Mining technologies typically remove large amounts of non-valuable geological materials from the earth along with the valuable material(s) of interest. The target material is then separated from the non-valuable material. The target material can undergo further processing to concentrate it or to make it otherwise more suitable for its end-use. The non-valuable material ("gangue") remaining after the extraction and processing of the target material becomes waste, requiring disposal. This mining waste comprises geological substances such as topsoil, overburden and waste rock that are separated during the earlier stages of processing, as well as tailings remaining after the target material has been largely recovered.

Processing technologies to extract target materials from the gangue can begin by crushing the raw mined substances into smaller fragments. The crushed fragments are then separated by size, and are further treated so that the target materials can be separated physically or chemically from the gangue. Water-driven separation processes are often used to facilitate removing the gangue from the target material. Crushing and separation techniques produce fragments of varying sizes, from large lumps to fine particles. Larger masses of waste materials can be removed mechanically during processing. The fine particles, comprising both target materials and waste, can become suspended in the aqueous fluid stream used for separation processing. This fluid stream, carrying the suspended fine particles ("fines") ultimately exits the processing plant as a liquid waste slurry requiring disposal. This waste slurry contains predominately low-value substances to be discarded as wasted, but it also contains fine particles of target materials that have not been captured by the various extraction processes. In certain cases, the waste slurry is stored in artificial reservoirs, such as tailings ponds. In other cases, the waste slurry is allowed to dessicate, so that the waste products, containing valuable target materials, are stored in dry piles.

Tailings from mining processes thus can contain varying amoungs of valuable target materials, depending, inter alia, upon the initial content of the target material in the mined substance, and upon the efficiency of the separation and extraction processes. Economics can dictate the extent to which the target material is removed during such processing. A precious metal like gold may be removed to a large degree from its ore, with only a small percent entering the tailings. The amount of precious metal in tailings, although small, can nonetheless have great economic value. By contrast, less valuable target materials may be of higher concentrations in tailings, because it does not make commercial sense to extract them more thoroughly. Though such target materials (e.g., coal) may have less intrinsic economic value than other target materials (e.g., precious metals), the relatively high concentration of the lower-value target materials in the tailings waste can make their recovery commercially viable. Processes for recovering target materials from tailings waste therefore offer the potential for extracting additional economic value from what has traditionally been discarded. Moreover, techniques for recovering target materials from tailings waste can offer alternatives to the traditional methods for tailings management, including storage in ponds or behind dikes or embankments or in spent mines (all with well-known environmental implications).

As an example, the mining and processing of coal results in tailings containing significant amounts of this valuable target material. In the U.S., around 1.1 billion tons of coal are mined annually. Approximately 8-10% of mined coal ends up as fines, which are not captured by the production process and typically end up in slurry impoundments. The U.S. Department of Energy estimates that 2 billion tons of coal fines currently exist in impoundment areas. Recovering coal as the target material from such tailings offers a significant economic and environmental opportunity. Recovering coal fines from slurry streams and impoundments can improve coal mining efficiency, because the recovered coal fines can be processed and used for fuel. In addition, recovering coal fines can reduce the waste footprint of coal mining operations. However, recovering coal fines from waste streams in an easy and efficient manner, and in a condition where the recovered coal is ready for transport and other uses, remains a great challenge.

The mining and processing of coal illustrates how such tailings are formed, and how they come to contain sufficient target material to be economically valuable. Coal as it is recovered from the mine is initially crushed to reduce its size and to free it up from the larger mineral inclusions, using a variety of size reduction techniques like crushers, rotary breakers or other similar devices. After crushing and size separation, the smaller coal fragments can be exposed to an aqueous stream such as froth flotation that separates the coal from the minerals that surround it. Using froth flotation, for example, crushed coal fragments can be mixed with water and other additives, then exposed to streams of air bubbles. Coal that is carried to the surface in the froth can be skimmed off, screened and dewatered for commercial uses, while the minerals sink to the bottom. After these water-driven separation processes, fine particles ("fines") comprising inorganic and organic materials (coal, clay, rocks, minerals, and the like) remain suspended in the aqueous slurry.

The fines comprising coal particles can be termed "coal fines." Separating fines from the aqueous suspending medium is difficult, as the fines tend to remain suspended unless energy-intensive processes are employed to recover them. In coal mining and processing, significant quantities of coal fines are created that require disposal and handling. Similar aqueous streams containing suspended fines are produced during the mining and processing of other valuable mined materials.

As mentioned above, the amount of suspended fines in the aqueous slurry stream can vary, depending upon the type of valuable material being mined and depending upon how it is processed. As an example, the amount of coal fines in the slurry stream will vary by site depending on the efficiency of the coal processing facility. Other fines in the coal-fines slurry include clays and fine mineral materials. Treating the slurry to remove all suspended solids and recover clarified water is a difficult problem. Additionally, it is highly desirable to recover the high value mined material, such as coal fines in this example, from the aqueous slurry. Older, less efficient coal processing facilities tend to have larger quantities of valuable coal fines ending up in the slurry stream. To increase the overall efficiency of coal processing, the ability to selectively recover the valuable coal fines from the slurry is needed. Recovering the coal-rich fines from the slurry by mechanical means is difficult, expensive, and inefficient.

There remains a need in the art, therefore for systems and methods for recovering valuable materials from mining tailings. Coal offers an example of such a valuable mined material. As would be apparent to skilled artisans, though, the problem of recovering valuable mined materials from tailings waste extends throughout the mining industry. There exists a need in the art for systems and methods capable of recovering a variety of valuable mined materials, including but not limited to precious metals, base metals, rare earth minerals, and the like, from the tailings waste in which they are contained.

SUMMARY

Disclosed herein, in embodiments, are systems for recovering a target material from an aqueous stream, comprising an extractant formulation comprising a light hydrocarbon solvent and a high molecular weight hydrophobic polymer, wherein the extractant formulation is mixable with the aqueous stream in a mixer to form an admixed solution having a hydrophobic portion and an aqueous portion, with the target material partitioning to the hydrophobic portion, a separator for isolating the hydrophobic portion from the aqueous portion, and a collector to which the hydrophobic portion is directed, wherein the target material is recovered from the hydrophobic portion. In embodiments, the target material is a natively hydrophobic target material. In embodiments, the natively hydrophobic target material is a hydrocarbon material. In embodiments, the hydrocarbon material comprises coal. In embodiments, the target material has a surface modification that renders it hydrophobic. In embodiments, the target material is a metallic material. The metallic material can be selected from the group consisting of precious metals, base metals and rare earth minerals. In embodiments, the light hydrocarbon solvent and the high molecular weight hydrophobic polymer are mixed together before the extractant formulation is mixed with the aqueous stream. In embodiments, the light hydrocarbon solvent and the high molecular weight hydrophobic polymer are added separately to the aqueous stream. In embodiments, the high molecular weight hydrophobic polymer has an affinity for the hydrophobic target material to form an agglomeration therewith, and wherein the agglomeration is recoverable. In embodiments, the system further comprises a mechanical aggregator that consolidates the target material recovered from the hydrophobic portion. In embodiments, the target material consolidated by the mechanical aggregator is an agglomerated target material. In embodiments, the system further comprises a recycling circuit to reuse the hydrophobic portion remaining after the target material is recovered from the hydrophobic portion.

Also disclosed herein, in embodiments, are methods for recovering a target material from an aqueous stream, comprising: providing a light hydrocarbon solvent and a high molecular weight hydrophobic polymer; adding the light hydrocarbon solvent and the high molecular weight hydrophobic polymer to the aqueous stream to form a treated aqueous stream having a hydrophobic component and an aqueous component, wherein the hydrophobic component contains the target material; separating the hydrophobic component from the aqueous component; and recovering the target material from the hydrophobic component. In embodiments, the target material is a natively hydrophobic material. In embodiments, the natively hydrophobic target material comprises coal. In embodiments, the light hydrophobic solvent and the high molecular weight hydrophobic polymer are added separately to the aqueous stream. In embodiments, the light hydrocarbon solvent comprises d-limonene. In embodiments, the target material has a surface modification that renders it hydrophobic. In embodiments, the target material is a metallic material. In embodiments, the methods further comprise agglomerating the target material by its interaction with the high molecular weight hydrophobic polymer. In embodiments, the methods further comprise aggregating the target material after recovering it to form a consolidated mass. In embodiments, the consolidated mass comprises target material agglomerated by its interaction with the high molecular weight hydrophobic polymer. In embodiments, the methods further comprise recycling the hydrophobic component to use as the light hydrophobic solvent. In embodiments, the methods further comprise removing the aqueous component as waste after the aqueous component is separated from the hydrophobic component.

In yet other embodiments, methods are disclosed herein for recovering a target material from an aqueous stream, comprising providing the system disclosed above, and directing the aqueous stream containing the target material into the system, thereby recovering the target material. In embodiments, the target material is a natively hydrophobic material. In embodiments, the target material has a surface modification that renders it hydrophobic. In embodiments, the target material is a metallic material.

DETAILED DESCRIPTION

Disclosed herein, in embodiments, are systems and methods for safely, easily and economically recovering valuable mined materials from aqueous waste streams. These valuable mined materials (also called "target materials") in fine particulate form ("fines") can be suspended in aqueous fluid streams or reservoirs. The systems and methods disclosed herein can capture the target material fines from aqueous suspension and allow their recovery. In embodiments, the captured fines can be recovered as an agglomerated mass that can be easily separated from the recovery medium, as described below. This can permit the ready recycling of the recovery medium for reuse in capturing further target material fines from aqueous suspensions, with minimal or no modification to the recycled recovery medium. The agglomerated target material can be consolidated for subsequent commercial use. In the case of a combustible target material like coal, the agglomerations can be used as a fuel source. In the case of a precious or base metal target material or other mineral having economic advantage, the target material can be further separated, purified, refined, or otherwise prepared for end-use.

As an exemplary embodiment, the systems and methods disclosed herein can be applied to coal fines, including coal fines from waste slurry streams at operating coal mines, or from existing empoundments. Using these systems and methods, a significant fraction of coal fines can be recovered from waste streams; furthermore, the recovered coal can be aggregated into dry masses that are suitable for stacking or transportation. In other exemplary embodiments, the systems and methods disclosed herein can be applied to valuable mined target materials like metals. In other embodiments, dried waste materials from mining processes that may contain valuable target materials can be resuspended in an aqueous medium and treated with the systems and methods disclosed herein, in order to recover the valuable target materials.

In embodiments, these systems and methods employ a recovery medium comprising an extractant formulation that includes a light hydrocarbon solvent and a high molecular weight hydrophobic polymer. The formulation can be added to an aqueous waste stream to selectively recover the suspended fines of valuable mined material and to aggregate them into manageable dry masses. These systems and methods further provide for recycling and reuse of the light hydrocarbon solvent after treatment of the initial waste stream. Because the recovery medium is formulated as a hydrophobic solution, it is advantageously used to recover valuable mined material that is hydrophobic in nature, or that can be rendered hydrophobic by appropriate treatment.

1. Extractant Formulations

In an embodiment, the extractant formulation can be prepared by dissolving a high molecular weight polymer in a light hydrocarbon solvent. In embodiments, useful high molecular weight polymers can have a weight greater than about 100,000 MW, for example, and they can be hydrocarbon-containing or hydrocarbon based. In embodiments, the polymers can have aromatic functionality, either in the polymer backbone or on a side-chain group. In embodiments, the polymers can be linear, with short side chains or no side chains, and they can contain double bonds in the polymer backbone. Examples of suitable polymers include polymers such as polyisoprene, poly(styrene-butadiene), polybutadiene, polyethylenes, polypropylenes, polybutenes, polybutylenes, other higher polyolefins, and polymethylmethacrylate, and the like. Examples of suitable hydrocarbon solvents include such as toluene, heptane, camp fuel, naphtha, and fuel oils, D-limonene, mineral oil and the like. In embodiments, useful light hydrocarbon solvents can have a relatively high flash point and boiling point (greater than about than 100° C. for example) to maximize safe handling for the extractant and to optimize the recovery of the target material. In embodiments, the solvent can contain one or more aromatic groups. The solvent can comprise one or more chemical constituents, for example in a blend like naphtha or other petroleum distillates. As used herein, the term "naphtha" can include light or heavy napthhas, where light naphtha is a mixture of hydrocarbons comprising mainly straight-chained and cyclic aliphatic hydrocarbons having from five to nine carbon atoms per molecule and where heavy naphtha is a mixture of hydrocarbons comprising mainly straight-chained and cyclic aliphatic hydrocarbons having from seven to nine carbons per molecule. In embodiments, the polymer can be dissolved in the solvent at a selected concentration, where the concentration is determined by observable agglomeration of the coal fines in the extractant, typically at a poymer concentration of 500 to 10,000 ppm. In embodiments, different slurries containing target materials can be treated with specific formulations of the extractant, including different combinations of solvent and polymer, along with different concentrations of the polymer in the solvent. An optimal extractant formulation results in significant capture of target materials from the aqueous stream. For example, as applied to a hydrophobic material like coal, the use of the recovery medium as described herein can result in significant coal capture from the aqueous stream, with a high purity coal agglomerate being formed.

2. Recovery of Hydrophobic Target Materials

As an example of a natively hydrophobic target material, coal can be recovered from an aqueous stream or reservoir by using recovery media as described herein. In an embodiment, a recovery medium comprising the hydrophobic extractant formulation can be mixed into an aqueous stream containing suspended coal fines, or into a vessel or reservoir containing an aqueous suspension of coal fines, where the term "reservoir" includes any natural or manmade structure or feature capable of containing a large volume of aqueous material (e.g., a tailings pond, tank, diked enclosure, underground chamber, or the like). After exposure to the extractant formulation, the fluid separates gravimetrically into two layers, with the extractant layer bearing the recovered coal forming on top of the aqueous layer. If the top layer is then separated from the aqueous layer, it is found to contain the agglomerated coal. As an example, if the extractant formulation is mixed into a vessel containing an aqueous slurry bearing coal fines, a coal-containing extractant layer can form almost instantaneously after agitation of the formulation with the slurry mixture stops. For example, if the extractant and slurry are mixed in a mixing tank, halting the mixing can allow the coal-extractant layer to form. In another embodiment, coal can be recovered by mixing the aqueous stream with the recovery medium in a mix tank, then flowing this mixture into a second vessel to settle. In another embodiment, the extractant and slurry streams can be pumped together through an in-line mixer, following which the mixed stream can be directed into a static separation vessel, where the coal-extractant layer can form.

In embodiments, the coal-containing extractant layer can be recovered as an overflow stream, by skimming, or screening. In embodiments, once the coal-extractant layer is isolated, the coal can be separated from the extractant by any number of solid-liquid separation techniques, including filtration, screening, decanting, or by a thermal process of heating the extractant and recovering it as a condensate. The coal fines are aggregated by the polymer in the extractant formulation and can be handled by standard solids handling equipment, including various conveying technologies. For example, the agglomerated coal can be stacked for storage. Optionally, the agglomerated coal can be dried at ambient conditions or by thermal heating. Coal agglomerates can be produced by these systems and methods that are suitable for use as fuel products. Following the recovery of the agglomerated coal, the extractant formulation can be recovered, and at a sufficient purity that it can be immediately recycled for further use in treating aqueous streams bearing coal fines.

Not to be bound by theory, it is postulated that the extractant formulation acts to remove coal fines from aqueous slurry streams by two separate but cooperative mechanisms. First, the light hydrocarbon solvent can serve as a medium of itself for extracting the hydrophobic coal fines by attracting the coal fines to the hydrophobic solvent fraction. Second, the polymer in the formulation selectively aggregates the hydrophobic coal fines, thus increasing the efficiency of the extraction process. The result of these two mechanisms is an aggregated mass of coal fines that is readily stored, handled and transported. The coal that is aggregated by this process does not bind to the solvent, so that the solvent can be readily removed from the amassed coal, permitting the solvent to be recycled easily.

3. Recovery of Non-Hydrophobic Target Materials

The systems and methods disclosed above are directed to the use of a hydrophobic extractant formulation that can attract and agglomerate hydrophobic target materials, e.g., coal. If these systems and methods are to be applied to non-hydrophobic target materials, such target materials can advantageously be treated to render them hydrophobic or otherwise compatible with the systems and methods disclosed herein.

For example, a recovery medium comprising the extractant formulation with the hydrophobic solvent and the high molecular weight hydrophobic polymer can be applied to materials which may or may not be natively hydrophobic. As examples, fine metallic particles from mining operations, such as gold, silver, or copper mining, can be found in waste streams and waste reservoirs following mining operations. Often, commercially significant amounts of such valuable target materials remain in the waste streams or waste reservoirs, with deleterious commercial and economic consequences. These valuable target materials can be recovered from tailings using the recovery media disclosed herein.

In certain cases, metallic fines like gold particles can be recovered using only an extractant formulation as described above. In other cases, a pre-treatment or simultaneous treatment process can be employed to render the target materials sufficiently hydrophobic that they can be receptive to the extractant formulations as disclosed herein. For example, to improve the recovery of fine metal particles, a treatment (either a pretreatment or a simultaneous treatment) can be introduced into the aqueous stream to modify the surfaces of the metal fines so that they can more readily interact with the components of the extractant formulation. An exemplary treatment process can expose the metal fines to small molecules containing thiol or disulfide groups, where the small molecules selectively bind to metals to modify surface properties, such as increasing the particles' hydrophobicity. As examples, a number of alkyl and/or aromatic thiols can be used in this manner, such as various butanethiols, hexanethiols, octanethiols, decanethiols, etc., 1,1',4',1"-terphenyl-4-thiol, naphthalenethiols, phenylethanethiols, and thiophenols, and the like. In other embodiments, small molecules that have other classes of surface modifiers, such as alkyl and or aromatic small molecules containing disulfide group(s), phosphonic acid group(s), silane functionality, various surfactants, and the like, can be used to treat the target materials.

In yet other embodiments, polymers can be used to modify the surface properties of the target materials to render them more receptive to the extractant formulations as disclosed herein. For example, polymers can be prepared having functional groups like those found on the small molecules described above for introducing hydrophobicity, and also having functionalities allowing them to attract and aggregate the target materials more readily. Hydrophilic polymers with alkane and/or aromatic backbones that contain thiol or disulfide groups, for example, can interact with metal particles to modify their surface properties to increase hydrophobicity, while also forming small aggregate of the particles. In embodiments, polymers or copolymers containing phosphonate, hydroxamate, dithiocarbamate, and xanthate groups can be used. In other embodiments, polymers or copolymers having phosphonic acid groups or silane functionality can be used. These useful functional groups can be incorporated in the polymer as manufactured; alternatively they can be produced by neutralization of the corresponding acid groups, or generated by hydrolysis of a precursor such as an ester, amide, anhydride, or nitrile group, or introduced to the polymer through chemical modification.

To apply the surface modifying agent to the target material, the agent can be introduced into the fluid stream before the extractant formulation is introduced, or while the extractant formulation is being introduced. In an embodiment, the surface modifier can be introduced by pumping a solution containing the surface modifier(s) into an aqueous fluid stream or a reservoir containing the target materials. The surface modifier can then be admixed via turbulent flow in the fluid stream, via in-line mixing, or via mixing within a static vessel.

EXAMPLES

The following materials were used in the examples below:
Toluene, JT Baker
Heptane, BDH
Camp Fuel, Coleman
Naphtha, Sunnyside ("SS Naphtha")
Elvacite 2552, Lucite International
Polyisoprene, Scientific Polymer Products Inc.
Poly(styrene-butadiene), Sigma-Aldrich
Lubrizol OS#174576F, Lubrizol
D-limonene, Florida Chemical Company Inc.

Four different coal slurry samples provided by operating mines were tested for coal fines recovery. The total solids content and coal content of each slurry or impoundment sample are as follows:
Sample A, 10.6% solids, 47.4% of solids are coal fines
Sample B, 5.0% solids, 37.9% of solids are coal fines
Sample C, 3.2% solids, 43.5% of solids are coal fines
Sample D, 28.1% solids, 74.1% of solids are coal fines
Sample E, 65.15% solids, 80.2% of solids are coal fines
Sample F, 74.5% solicds, 72% of solids are coal fines.

The slurry samples were mixed with an overhead stirrer before each experiment to resuspend any particles that may have settled prior to testing. Samples A, B and C were used in the experiments as provided. Sample D was diluted to 5% solids content with tap water before each experiment.

Example 1

Lab-Scale Batch Testing, No Polymer

Figure 1:
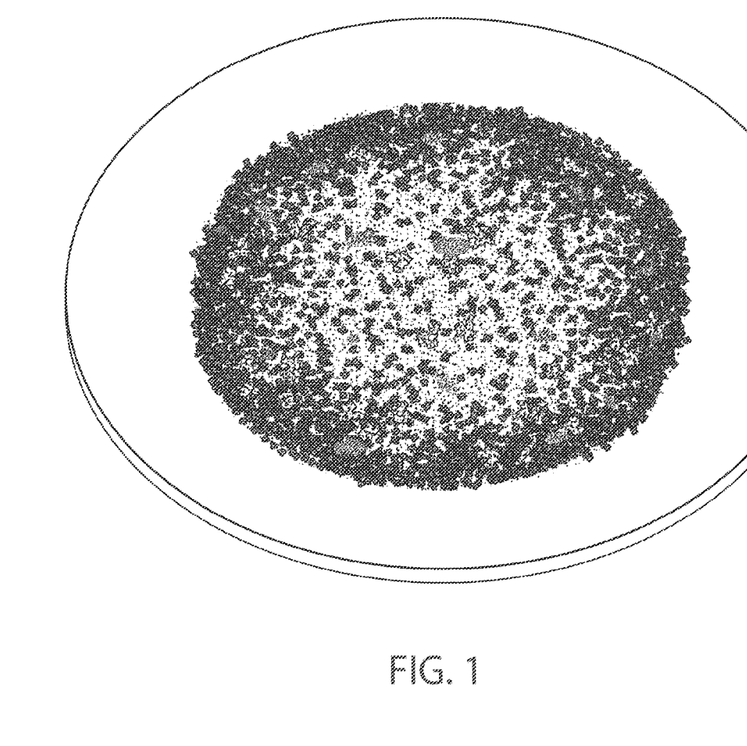
FIG. 1 shows recovered coal fines in accordance with Example 1.

For each coal fines recovery test, 200 g of well-mixed coal slurry sample was added to a glass jar followed by addition of an appropriate amount of solvent. The jar was capped and shaken for 15 seconds. The mixture was allowed to sit for five minutes, during which the contents separate into three layers: coal and solvent at the top, water in the middle and clay at the bottom. The top solvent-wetted coal layer was scooped out of the glass jar into a beaker, and the solvent-wetted coal was placed in a vacuum oven at 60° C. until it was dry (~4 hours). The dried coal was weighed, and coal recovery was calculated as a percentage of total coal present in the initial slurry sample. The ash content of the dried coal was measured according to the ASTM D3174-04. A sample of coal fines recovered in accordance with Example 1 is shown in FIG. 1.

The results of Example 1 are set forth below in Table 1:

TABLE 1

| Sample | Solvent | Solvent to Coal Ratio | Recovered Coal Purity (%) | Coal Recovery (%) |
|---|---|---|---|---|
| A | Toluene | 3 | 77.71 | 15.65 |
| A | Toluene | 4 | 79.26 | 11.21 |
| A | Toluene | 6 | 79.12 | 15.99 |
| A | Heptane | 5 | 59.50 | 34.30 |
| A | Heptane | 10 | 60.86 | 34.80 |
| A | Camp Fuel | 3 | 57.54 | 22.61 |
| A | Camp Fuel | 5 | 68.30 | 14.97 |
| A | Camp Fuel | 7 | 57.70 | 50.84 |
| A | Camp Fuel | 9 | 56.80 | 59.27 |
| A | Camp Fuel | 11 | 54.40 | 63.37 |
| A | SS Naphtha | 3 | 51.70 | 24.42 |
| A | SS Naphtha | 5 | 58.24 | 67.75 |
| B | Toluene | 5 | 88.45 | 87.79 |
| B | Heptane | 5 | 89.83 | 88.91 |
| B | Camp Fuel | 1 | 95.29 | 46.11 |
| B | Camp Fuel | 3 | 91.81 | 87.85 |
| B | Camp Fuel | 5 | 89.83 | 88.91 |
| B | Camp Fuel | 10 | 88.48 | 94.28 |
| B | SS Naphtha | 5 | 91.80 | 84.96 |
| C | Camp Fuel | 1 | 97.52 | 41.68 |
| C | Camp Fuel | 3 | 96.20 | 55.63 |
| C | Camp Fuel | 5 | 96.05 | 66.59 |
| D | Camp Fuel | 1 | 99.29 | 12.82 |
| D | Camp Fuel | 3 | 91.79 | 50.79 |
| D | Camp Fuel | 5 | 94.36 | 44.80 |
| D | Camp Fuel | 10 | 95.76 | 64.10. |

Table 1 shows that, with the exception of Sample A, the purity of the recovered coal was above 85%. Table 1 also shows that increased amounts of solvent increased coal recovery up to a certain solvent dosage, beyond which increased solvent addition had no further effect on coal recovery. In addition, the results for Sample D indicate that these methods are suitable for use on tailings pounds or impoundments as well as fresh tailings. For Sample A, the purity of the recovered coal remained around 60%, when exposed to heptane, camp fuel, or SS naphtha extractants. These findings may be due to the complexing of coal and clay particles in Sample A that affect the recovery of pure coal.

Example 2

Lab-Scale Batch Testing with Polymer

For each coal fines recovery test in this Example, the polymer was dissolved in a solvent at a chosen dosage before adding the solvent to the coal slurry. After 20 seconds of mixing, and 5 minutes of phase separation, the top agglomerated coal layer was scooped out into a beaker. The agglomerated coal was dried and its recovery and purity measured as described above. The results are set forth in Table 2:

TABLE 2

| Sample | Solvent | % Polymer in solvent | Solvent to Coal Ratio | Recovered Coal Purity (%) | Coal Recovery (%) |
|---|---|---|---|---|---|
| A | Toluene | 0.1% Poly(Sty-Bu) | 5 | 77.89 | 20.47 |
| A | Toluene | 0.1% Poly(Sty-Bu) | 6 | 82.52 | 21.95 |
| A | Camp Fuel | 0.05% Elvacite | 3 | 44.12 | 16.18 |
| A | Camp Fuel | 0.1% Polyisoprene | 3 | 65.18 | 18.31 |
| B | Camp Fuel | 0.1% Poly(Sty-Bu) | 1 | 91.81 | 73.73 |
| B | Camp Fuel | 0.1% Lubrizol | 5 | 94.13 | 87.07 |
| C | Camp Fuel | 0.1% Lubrizol | 5 | 96.26 | 83.15 |
| D | Camp Fuel | 1% Lubrizol | 5 | 98.36 | 50.34 |
| D | Camp Fuel | 0.1% Poly(Sty-Bu) | 1 | 87.40 | 53.19 |
| D | Camp Fuel | 0.1% Poly(Sty-Bu) | 3 | 85.41 | 72.50 |
| D | Camp Fuel | 1% Poly(Sty-Bu) | 3 | 87.42 | 69.02. |

As shown in Table 2, coal fines recovery amount can be increased by the addition of a polymer to the solvent, as compared to the use of solvent alone (e.g., when Lubrizol and poly(styrene-butadiene) polymers were added). The purity of the coal samples remained close to the purity obtained without the use of polymers.

Figure 2:
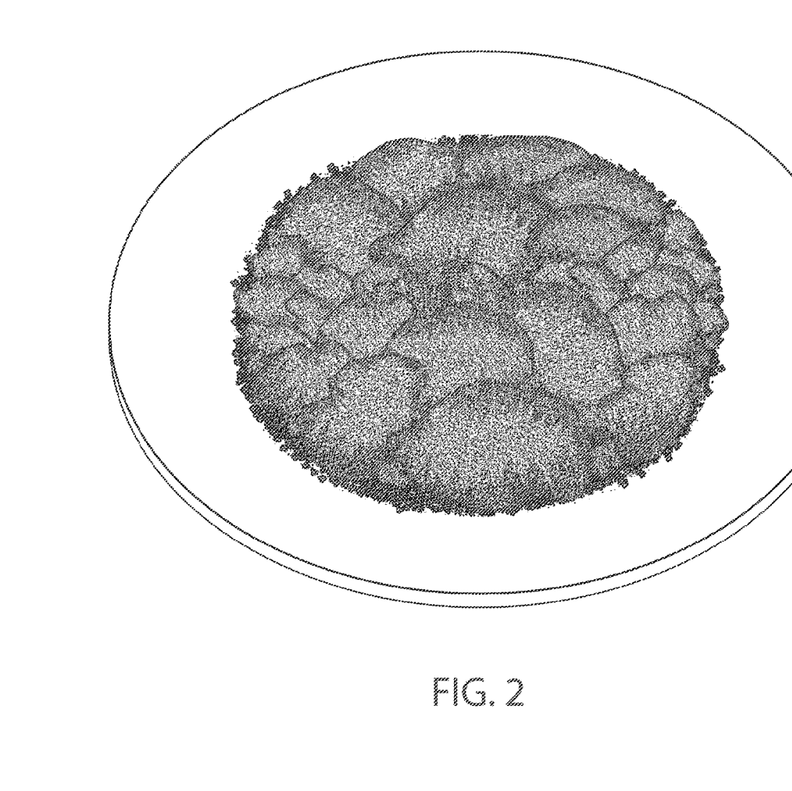
FIG. 2 shows recovered coal fines in accordance with Example 2.
Figure 3:
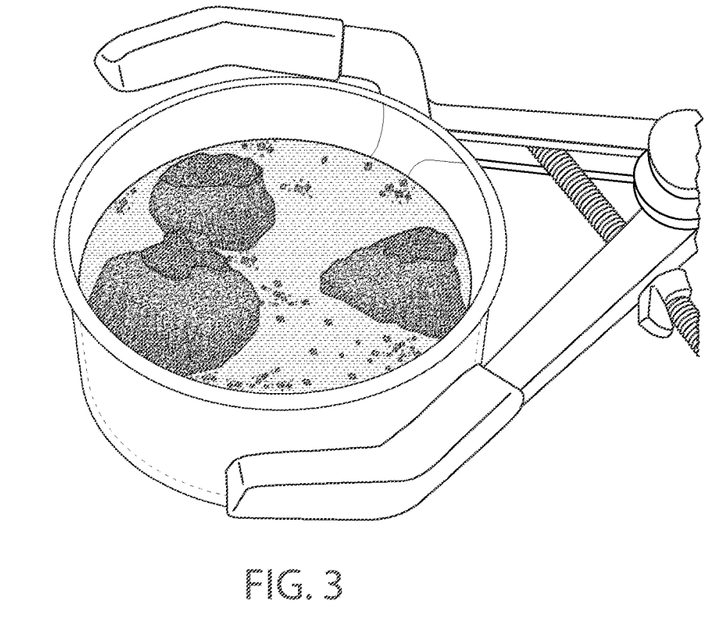
FIG. 3 shows the recovered coal fines of Example 2 submerged in water.

In this Example, it was demonstrated that the use of selected polymers in the extractant formulation also yielded compacted, agglomerated coal particles. These results are shown in FIG. 2 and FIG. 3. As FIG. 2 shows, the use of certain polymers according to this Example can bind the coal fines together even after drying, yielding a manipulable mass of coal instead of a coal powder. FIG. 3 shows that a coal mass produced according to this Example remains intact even when resuspended in a water solution. Moreover, the formation of the coal mass according to this Example allows for its easy separation from the solvent, so that the solvent can be recycled. These data show that, not only did the polymers improve the coal recovery, but also they were effective in agglomerating and compacting coal particles, resulting in higher solvent recovery. In addition, the polymers help bind the coal fines together even after drying, to produce a handle-able chunk of coal instead of powdery coal.

Example 3

Continuous Process with Polymer

Figure 4:
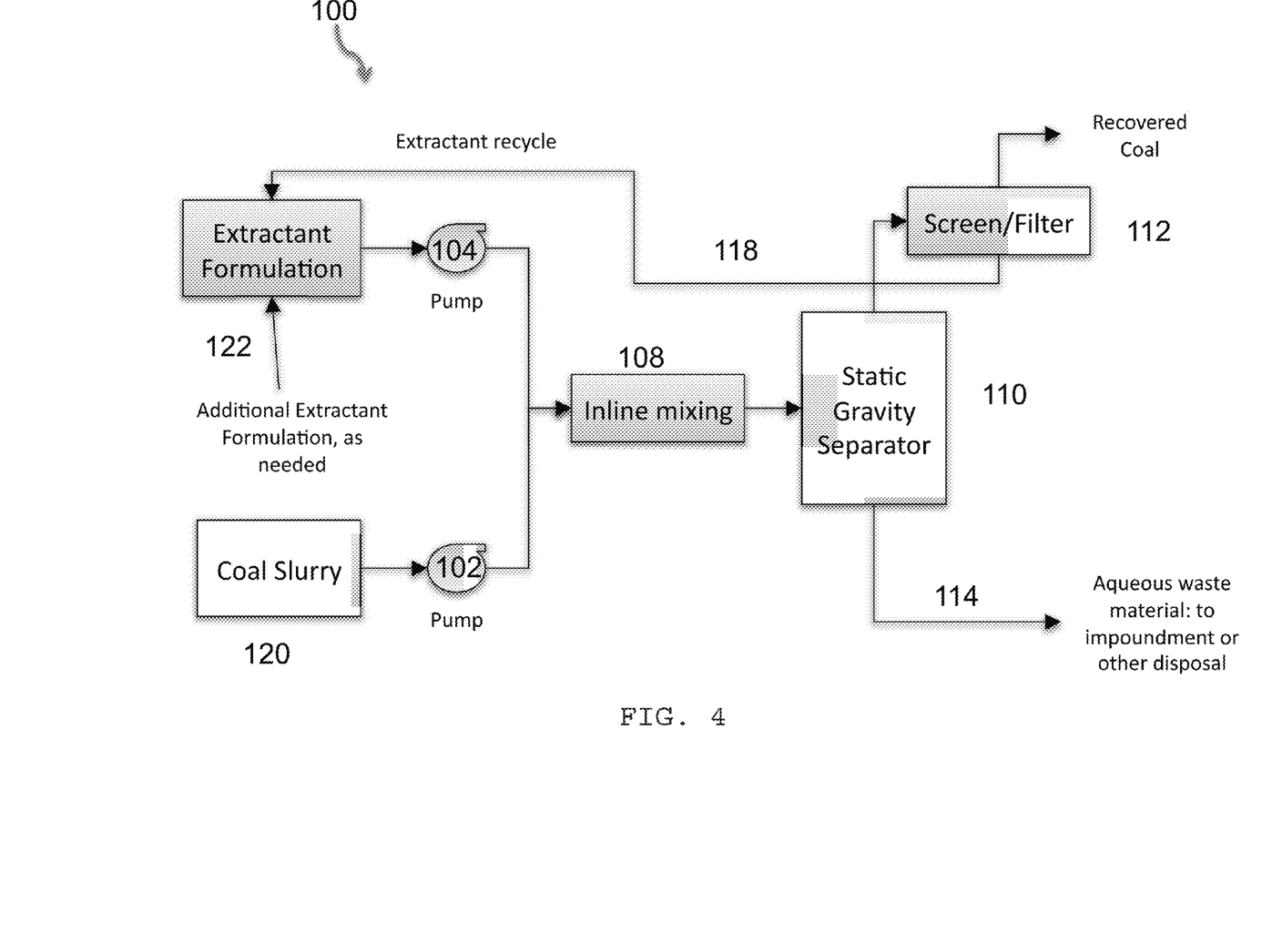
FIG. 4 shows a block diagram of a system for recovering valuable mined materials from aqueous streams.
Figure 5:
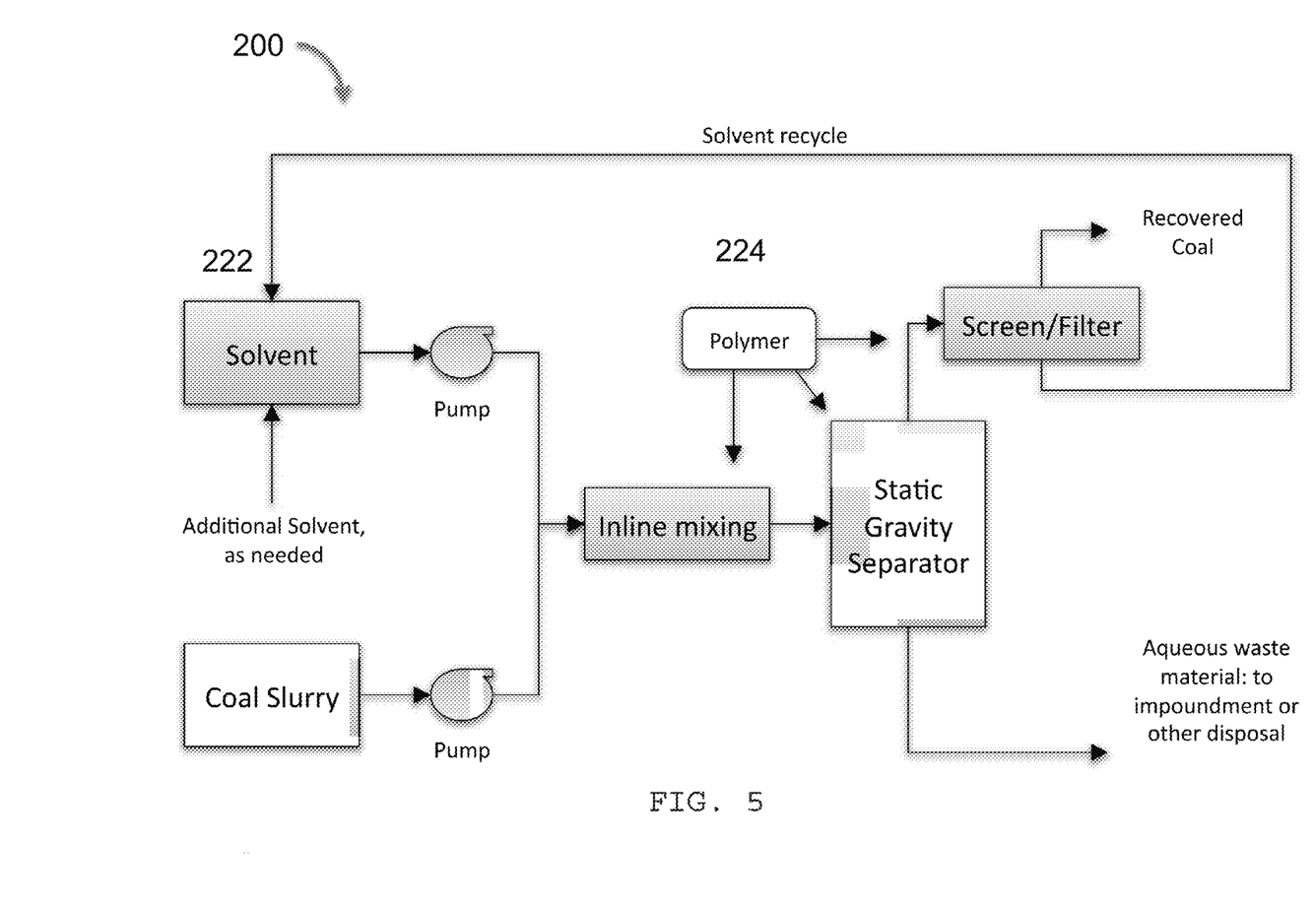
FIG. 5 shows a block diagram of another system for recovering valuable mined materials from aqueous streams.

In this Example, a setup of two pumps and an in-line mixer was used, as illustrated in FIG. 4. The system 100 illustrated in FIG. 4 allows for the mixing of a coal slurry 120 (an aqueous suspension of coal fines and admixed waste material) with an extractant formulation 122. As shown in this Figure, the coal slurry can be pumped into the system with a pump 102, as can the extractant formulation be pumped into the system with a pump 104. These two fluid streams can be combined by an inline mixer 108 to allow the extractant formulation 122 properly to contact the coal slurry 120. Following inline mixing 108, the fluid stream can be directed to static gravity separator 110 or comparable device to permit the hydrophobic solvent layer to separate from the aqueous layer, where the hydrophobic solvent layer carries the coal fines, and the aqueous layer carries the rest of the fine particulate matter. The hydrophobic solvent layer can then be directed to the screen or filter 112, which removes the solid coal masses from the solvent. This permits the extractant formulation to be recycled along a recycle path 118. As described above the extractant formulation 122 can contain both a hydrophobic solvent and a hydrophobic polymer, where the polymer permits the coal captured in the hydrophobic solvent to become agglomerated, thus facilitating its recovery. In accordance with FIG. 4, the extractant formulation can be prepared to contain both the hydrophobic solvent and the hydrophobic polymer. FIG. 5 shows an alternative embodiment of a system 200 where the hydrophobic polymer 224 is added separately from the hydrophobic solvent 222, with the other components of the system arranged as shown in FIG. 4.

In more detail, for this Example, coal slurry was pumped at the rate of 1 gpm and the extractant formulation or solvent flow rate was adjusted according to the predetermined solvent to coal ratio, so that the extractant and slurry vessels would empty at the same pace. The two streams were commingled at a tee junction, and the resulting fluid stream was passed through a set of in-line mixers. The well-mixed fluid stream was directed into the separation vessel where separation of the top hydrophobic layer and bottom aqueous layer occurred. The hydrophobic layer contained the coal, and the aqueous layer contained clay, minerals and other waste materials. The coal-bearing hydrophobic layer was automatically recovered as the overflow stream, while the aqueous waste stream was discharged from the bottom of the separation vessel. In this Example, the hydrophobic layer was directed into a collection vessel, where agglomerated coal settled and excess extractant could be recovered. At the end of the test, excess solvent was decanted out of the collection vessel, and the recovered coal was dried before measuring the recovery and purity values. Each test was run for approximately four minutes. The results are set forth in Table 3:

TABLE 3

| Sample | Solvent | % Polymer in solvent | Solvent to Coal Ratio | Recovered Coal Purity (%) | Coal Recovery (%) |
|---|---|---|---|---|---|
| B | Camp Fuel | — | 4 | 86.28 | — |
| B | Camp Fuel | 0.1% Poly(Sty-Bu) | 4 | 89.21 | — |
| C | Camp Fuel | — | 1 | 89.88 | 52.36 |
| D | Camp Fuel | — | 1 | 86.95 | 16.18 |
| D | Camp Fuel | 0.1% Poly(Sty-Bu) | 1 | 95.39 | 58.08. |

These results show that the separation of top coal and bottom clay-water layers takes place fast enough that a simple in-line gravity separation process can be used. In addition, the recovery and purity of coal recovered remained the same as lab-scale batch process, suggesting that a continuous scale-up is feasible without sacrificing the quality and quantity of coal recovered.

Example 4

Lab-Scale Batch Testing, No Polymer (Procedure 2)

For each coal fines recovery test, well-mixed coal slurry sample (250 g, 350 g, or 500 g) was added to a glass jar followed by addition of an appropriate amount of solvent. The contents were mixed with an over-head mixer at 800 rpm for 20 minutes. The mixture was allowed to sit for ten minutes, during which the contents separated into three layers: coal and solvent at the top, water in the middle and clay at the bottom. The top solvent-wetted coal layer was scooped out of the glass jar into a beaker, and the solvent-wetted coal was placed in a vacuum oven at 60° C. until it was dry (~4 hours). The dried coal was weighed, and coal recovery was calculated as a percentage of total coal present in the initial slurry sample. The ash content of the dried coal was measured according to the ASTM D3174-04. The results of Example 4 are set forth below in Table 4:

TABLE 4

| Sample | Solvent | Solvent to Coal Ratio | Recovered Coal Purity (%) | Coal Recovery (%) |
|---|---|---|---|---|
| E | d-limonene | 3 | 94.51 | (not available) |
| E | d-limonene | 3 | 94.64 | 78.40 |
| F | d-limonene | 5 | 94.55 | 47.22 |
| F | d-limonene | 5 | 97.24 | 49.31. |

Table 4 shows that the purity of the recovered coal was above 94%. Table 4 also shows that coal recovery of almost 80% can be achieved with a solvent to coal ratio of 3. Recovery can be further improved performing multiple extractions with recycled solvent.

EQUIVALENTS

While specific embodiments of the subject invention have been discussed, the above specification is illustrative and not restrictive. Many variations of the invention will become apparent to those skilled in the art upon review of this specification. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth herein are approximations that can vary depending upon the desired properties sought to be obtained by the present invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for recovering a target material from an aqueous stream, comprising:
   providing an extractant formulation comprising naphtha and a high molecular weight hydrophobic polymer, wherein the high molecular weight hydrophobic polymer is dissolved in the naphtha;
   adding the extractant formulation to the aqueous stream to form an admixed fluid, wherein the admixed fluid separates by gravity separation alone into an aqueous layer and an extractant layer, wherein the extractant layer contains the target material and the naptha;
   separating the extractant layer from the aqueous layer; and
   recovering the target material from the extractant layer using solid-liquid separation.

2. The method of claim 1, wherein the target material is a natively hydrophobic material.

3. The method of claim 2, wherein the natively hydrophobic target material is coal.

4. The method of claim 1, wherein the target material has a surface modification that renders it hydrophobic.

5. The method of claim 4, wherein the target material is a metallic material.

6. The method of claim 1, wherein the target material is recovered as an agglomerated mass.

7. The method of claim 1, further comprising recovering the extractant formulation and reusing it.

8. The method of claim 1, further comprising removing the aqueous component as waste after the aqueous layer is separated from the extractant layer.

9. The method of claim 1, wherein the polymer is selected from the group consisting of polyisoprene, poly (styrene-butadiene), polybutadiene, polyethylenes, polypropylenes, polybutenes, polybutylenes, other higher polyolefins, and polymethylmethacrylate.

\* \* \* \* \*

UNITED STATES PATENT AND TRADEMARK OFFICE
CERTIFICATE OF CORRECTION

PATENT NO.        : 9,555,418 B2
APPLICATION NO.   : 13/479999
DATED             : January 31, 2017
INVENTOR(S)       : David S. Soane et al.

It is certified that error appears in the above-identified patent and that said Letters Patent is hereby corrected as shown below:

In the Claims

Column 12, Claim 1, Line 61: please delete "naptha" and replace with --naphtha--.

Signed and Sealed this
Sixteenth Day of May, 2017

Michelle K. Lee
*Director of the United States Patent and Trademark Office*